(12) United States Patent
Zaverucha (10) Patent No.: US 9,172,529 B2
(45) Date of Patent: Oct. 27, 2015

(54) HYBRID ENCRYPTION SCHEMES

(75) Inventor: Gregory Marc Zaverucha, Mississauga (CA)

(73) Assignee: Certicom Corp., Mississauga, Ontario (CA)

( * ) Notice: Subject to any disclaimer, the term of this patent is extended or adjusted under 35 U.S.C. 154(b) by 794 days.

(21) Appl. No.: 13/234,944

(22) Filed: Sep. 16, 2011

(65) Prior Publication Data

US 2013/0073850 A1    Mar. 21, 2013

(51) Int. Cl.
*H04L 29/06* (2006.01)
*H04L 9/00* (2006.01)
*H04L 9/08* (2006.01)
*H04L 9/30* (2006.01)

(52) U.S. Cl.
CPC .............. *H04L 9/002* (2013.01); *H04L 9/0869* (2013.01); *H04L 9/302* (2013.01); *H04L 9/3073* (2013.01); *H04L 2209/12* (2013.01); *H04L 2209/30* (2013.01)

(58) Field of Classification Search
CPC .............................. H04L 9/002; H04L 9/0869
USPC .................................... 713/168; 380/259, 262
See application file for complete search history.

(56) References Cited

U.S. PATENT DOCUMENTS

| | | | | |
|---|---|---|---|---|
| 5,142,578 A * | 8/1992 | Matyas et al. | | 380/280 |
| 5,481,613 A * | 1/1996 | Ford et al. | | 380/30 |
| 5,631,961 A * | 5/1997 | Mills et al. | | 380/286 |
| 5,832,091 A * | 11/1998 | Tomko et al. | | 380/30 |
| 6,061,791 A * | 5/2000 | Moreau | | 713/171 |
| 6,965,673 B1 * | 11/2005 | Boneh et al. | | 380/28 |
| 7,103,181 B2 | 9/2006 | Ananth | | |
| 2001/0024501 A1 * | 9/2001 | Furukawa | | 380/28 |
| 2001/0046292 A1 * | 11/2001 | Gligor et al. | | 380/37 |
| 2002/0085710 A1 * | 7/2002 | Ananth | | 380/37 |
| 2004/0174997 A1 * | 9/2004 | Yamamichi et al. | | 380/44 |
| 2004/0179679 A1 * | 9/2004 | Hawkes et al. | | 380/30 |
| 2005/0094805 A1 * | 5/2005 | Kitani et al. | | 380/28 |
| 2006/0245590 A1 * | 11/2006 | Brickell | | 380/44 |
| 2008/0095360 A1 * | 4/2008 | Vuillaume et al. | | 380/44 |
| 2008/0123842 A1 * | 5/2008 | Pohja | | 380/44 |
| 2008/0253566 A1 | 10/2008 | Hidaka | | |
| 2010/0098253 A1 * | 4/2010 | Delerablee | | 380/259 |
| 2011/0022847 A1 * | 1/2011 | Duffy et al. | | 713/179 |
| 2011/0033046 A1 * | 2/2011 | Nonaka et al. | | 380/46 |
| 2012/0023336 A1 * | 1/2012 | Natarajan | | 713/179 |

(Continued)

OTHER PUBLICATIONS

Scarfone et al, Guide to Bluetooth Security, Sep. 2008, NIST, pp. 1-66.*

(Continued)

*Primary Examiner* — Bradley Holder
*Assistant Examiner* — Jenise Jackson
(74) *Attorney, Agent, or Firm* — Fish & Richardson P.C.

(57) ABSTRACT

Methods, systems, and computer programs for using hybrid encryption schemes are disclosed. In some implementations, a random value is obtained by a pseudorandom generator. A symmetric key is generated based on the random value. A public component is also generated based on the random value. Additionally, an initialization vector is generated based on the random value. The symmetric key and the initialization vector are used to generate an encrypted message based on an input message. The encrypted message and the public component are transmitted to an entity. At least one of the public component or the symmetric key is generated based additionally on a public key of the entity.

11 Claims, 6 Drawing Sheets

(56) References Cited

U.S. PATENT DOCUMENTS

| | | | | |
|---|---|---|---|---|
| 2012/0106738 | A1* | 5/2012 | Belenkiy et al. | 380/270 |
| 2012/0288072 | A1* | 11/2012 | Anderson | 379/88.22 |
| 2013/0142323 | A1* | 6/2013 | Chiarella | 380/28 |
| 2013/0318351 | A1* | 11/2013 | Hirano et al. | 713/168 |

OTHER PUBLICATIONS

Blahut et al, Secure Systems, Jan. 2004, Association for Computing Machiners, pp. 1-63.*

Ayachit et al, Evolutionary Computnig Based Secure Key Management Protocol, Jul. 31, 2010, IEEE, pp. 1-3.*

Yang et al, A Three-Party Authenticated Key Exchange Scheme, 2007, IEEE, pp. 1-6.*

M. Bellare, A. Boldyreva and S. Micali. Public-key Encryption in a Multi-User Setting: Security Proofs and Improvements. Proceedings of EUROCRYPT'00, LNCS 1807 (2000), 259-274.

M. Bellare, T. Kohno and V. Shoup. Stateful Public Key Cryptosystems: How to Encrypt with One 160-bit Exponentiation. Proceedings of the 13th ACM Conference on Computer and Communications Security (CCS'06), ACM Press, New York. 2006, 20 pages.

E. Biham. How to Forge DES-Encrypted Messages in $2^{(28)}$ Steps. Technion Department of Computer Science Technical Report No. CS0894-1996, 1996, 11 pages.

A. Biryukov and A. Shamir. Cryptanalytic time/memory/data tradeoffs for stream ciphers. Proceedings of ASIACRYPT'00, LNCS 1976 (2000), 1-13.

S. Chauerjee. A. Menezes and P. Sarkar. Another Look at Tightness dated Aug. 4, 2011, pp. 1-25.

FCD 18033-2, Encryption algorithms—Part 2: Asymmetric ciphers, draft dated Dec. 6, 2004, available online at http://shoup.net/iso/std6.pdf, 131 pages.

S. Halevi and H. Krawczyk, One-Pass HMQV and Asymmetric Key-Wrapping, IBM Research, Dec. 22, 2010, available online at http://eprint.iacr.org/2010/638.pdf, 19 pages.

A. J. Menezes, P. C. van Oorschot and S. A. Vanstone. Handbook of Applied Cryptography, Chapter 2: Mathematical Background, CRC Press, 1997, 39 pages.

A. J. Menezes, P. C. van Oorschot and S. A. Vanstone. Handbook of Applied Cryptography, Chapter 5: Pseudorandom Bits and Sequences, CRC Press, 1997, 23 pages.

A. J. Menezes, P. C. van Oorschot and S. A. Vanstone. Handbook of Applied Cryptography, Chapter 8: Public Key Encryption, CRC Press, 1997, 38 pages.

M.E. Hellman. A Cryptanatylic Time-Memory Trade-Off. IEEE Transactions on Information Theory 26 (1980), pp. 401-406.

J. Hong and P. Sarkar. New Application of Time Memory Data Tradeoffs, available online at http://www.iacr.org/archive/asiacrypt2005/348/348.pdf, 2005, 20 pages.

Institute of Electrical and Electronics Engineers. Specifications for Public-Key Cryptography, IEEE Standard 1363-2000, Aug. 2000, 236 pages.

Institute of Electrical and Electronics Engineers. Specifications for Public-Key Cryptography Amendment 1: Additional Techniques, IEEE Standard 1363A-2004, Sep. 2004, 168 pages.

V. Shoup, A Proposal for an ISO Standard for Public Key Encryption (version 2.1), available online at: http://eprint.iacr.org/2001/112.pdf, Dec. 2001, 63 pages.

R. Anderson and E. Biham. Two practical and provably secure block ciphers: BEAR and LION, available online at http://www.cl.cam.ac.uk/~rja14/Papers/bear-lion.pdf, 1996, 8 pages.

R. Rivest. All-or-nothing encryption and the package transform, available online at http://people.csail.mit.edu/rivest/Fusion.pdf, 1997, 9 pages.

D. Salomon, G. Motta and D. Bryant. Handbook of Data Compression (5th edition). Chapter 5—"Statistical Methods" (pp. 211-327). Chapter 6—"Dictionary Methods" (pp. 329-441), Springer-Verlag (2010), 230 pages total.

D. Harrington, Transport Subsystem for the Simple Network Management Protocol (SNMP), Network Working Group Request for Comments: 5590, Jun. 2009, 35 pages.

R. Housley, Cryptographic Message Syntax (CMS), Network Working Group Request for Comments: 5652, Sep. 2009, 57 pages.

ANSI X9.63-2001, Public Key Cryptography for the Financial Services Industry—Key Agreement and Key Transport Using Elliptic Curve Cryptography, Nov. 20, 2001, 415 pages.

ANSI X9.63-2011, Public Key Cryptography for the Financial Services Industry—Key Agreement and Key Transport Using Elliptic Curve Cryptography, Dec. 21, 2011, 155 pages.

"Hybrid Cryptosystem," Wikipedia, http://en.wikipedia.org/wiki/Hybrid_cryptosystem, dated Jun. 19, 2011, 2 pages.

Mihir Bellare and Phillip Rogaway, Introduction to Modern Cryptography, Chapter 11—Asymmetric Encryption, accessed on Aug. 25, 2011 at http://cseweb.ucsd.edu/users/mihir/cse207/classnotes.html and http://cseweb.ucsd.edu/users/mihir/cse207/w-asym.pdf, 27 pages.

M. Abdalla, M. Bellare and P. Rogaway. DHIES: An encryption scheme based on the Diffie-Hellman Problem, Available online at http://cseweb.ucsd.edu/~mihir/papers/dhaes.pdf, dated Sep. 18, 2001, 30 pages.

M. Bellare and P. Rogaway, Optimal Asymmetric Encryption—How to Encrypt with RSA. Available online at http://cseweb.ucsd.edu/~mihir/papers/oaep.html, dated Nov. 19, 1995, 19 pages.

W.C. Barker, NIST Special Publication 800-67: Recommendation for the Triple Data Encryption Algorithm (TDEA) Block Cipher. (Version 1.1) National institute of Standards and Technology, dated May 2008, 40 pages, Available online at: http://csrc.nist.gov/publications/nistpubs/800-67/SP800-67.pdf.

V. Gligor. The Fragility of Adversary Definitions in Cryptographic Protocols, Presentation at Rutgers University, Nov. 6, 2008, 35 pages.

D. McGrew. Generation of Deterministic Initialization Vectors (IVs) and Nonces. Internet Draft, dates Jul. 4, 2011, 25 pages.

Public-Key Cryptography Standards (PKCS) PKCS #1: RSA Cryptography Standard, version 2.1. Available online at ftp://ftp.rsasecurity.com/pub/pkcs/pkcs-1/pkcs-1v2-1.pdf, dated Jun. 14, 2002, 61 pages.

Standards for Efficient Cryptography Group, SEC 1: Elliptic Curve Cryptography, May 21, 2009, Version 2.0. Available online at: http://www.secg.org/download/aid-780/sec1-v2.pdf. 144 pages.

V, Shoup. A Proposal for an ISO Standard for Public Key Encryption (version 2.1), 63 pages. Dated Dec. 20, 2001. Available online at http://eprint.iacr.org/2001/112.pdf.

X. Boyen and L. Martin. Identity-Based Cryptography Standard (IBCS) #1: Supersingular Curve Implementations of the BF and BB1 Cryptosystems, Request for Comments 5091. Dated Dec. 2007, 64 pages.

Abdall, Michel et al.; "The Oracle Diffie-Hellman Assumptions and an Analysis of DHIES"; Topics in Cryptology—CT—RSA 2001; vol. 2020; Jan. 1, 2001; pp. 143-158.

Buttyan, Levente; "PGP—Pretty Good Privacy"; Sep. 29, 2008; Internet <http://web.archive.org/web/20080929205643/http://crysys.hu/members/bbencsath/courses/bp-07/pgp.pdf>.

Yau. Arnold K.L. et al.; "Padding Oracle Attacks on CBC-Mode Encryption with Secret and Random Ivs"; Fast Software Encryption; Lecture Notes in Computer Science; Jul. 8, 2005; pp. 299-319.

International Search Report and Written Opinion of the International Searching Authority issued in International Application No. PCT/US2012/051929 on Jan. 3, 3013; 10 pages.

Extended European Search Report issued in European Application No. 11181579.1 on Feb. 7, 2012; 8 pages.

Shoup, V. Oaep Reconsidered, available online at http://www.shoup.net/papers/oaep.pdf, Sep. 18, 2001, 27 pages.

Communication Pursuant to Article 94(3) EPC issued in European Application No. 11181579.1 on Oct. 4, 2013; 7 pages.

International Preliminary Examination Report on Patentability under Chapter I issued in International Application No. PCT/US2012/051929 on Mar. 27, 2014; 7 pages.

* cited by examiner

HYBRID ENCRYPTION SCHEMES

BACKGROUND

This specification relates to hybrid encryption schemes in a cryptography system. Cryptography systems allow entities to communicate in a secure manner over public channels. For example, a hybrid encryption scheme can be used to generate ciphertexts that can be decrypted efficiently only by using a particular entity's private key. In some instances, key collision attacks may be performed by an adversary to compromise the encryption scheme, for example, to decrypt ciphertexts transmitted between entities.

BRIEF DESCRIPTION OF THE DRAWINGS

Like reference numbers and designations in the various drawings indicate like elements.

DETAILED DESCRIPTION

Some hybrid encryption schemes are vulnerable to certain types of attacks. For example, hybrid encryption schemes that use a fixed or low-entropy initialization vector, and other types of hybrid encryption schemes, may be vulnerable to certain key collision attacks. Hybrid encryption schemes can be designed to include countermeasures that defeat such attacks. Some example countermeasures are described herein the context of Elliptic Curve Integrated Encryption Schemes (ECIES) and RSA hybrid encryption schemes. Such countermeasures can be adapted for other types of hybrid encryption schemes, as appropriate.

Hybrid encryption schemes can be used to encrypt messages exchanged between entities. A symmetric key can be used to generate the encrypted messages according to an encryption function. In some hybrid encryption schemes (e.g., ECIES), a message sender produces the symmetric key based on a random value and a public key of the message recipient. The encryption function generates the encrypted message from a plaintext message based on the symmetric key and an initialization vector. In some implementations, the initialization vector can be generated based on the random value that was used to produce the symmetric key.

In addition to the encrypted message, the message sender produces a public component. The public component can be generated based on the random value that was used to produce the symmetric key. In some hybrid encryption schemes (e.g., RSA-based hybrid encryption schemes), the message sender produces the public component based on the public key of the message recipient and the random value that was used to generate the symmetric key. The message sender sends the public component to the message recipient. The recipient can use the recipient's private key and the public component to produce the symmetric key. The message recipient can then use the symmetric key to produce the plaintext message from the encrypted message.

The random value(s) used by the hybrid encryption scheme can be produced by a pseudorandom generator. Some example pseudorandom generators are described in "Special Publication 800-90: Recommendation for Random Number Generation Using Deterministic Bit Generators (Revised)," by E. Barker and J. Kelsey, published by the National Institute of Standards and Technology, dated March 2007. These and other types of pseudorandom number generators can be used, as appropriate. A pseudorandom generator can be implemented in hardware, software, firmware, or any suitable combination thereof. A pseudorandom generator can operate deterministically and provide an output that appears random from an adversary's perspective. Accordingly, the output of a pseudorandom generator can be referred to as a random value although the pseudorandom generator itself operates deterministically. In some implementations, the random value obtained from a pseudorandom generator depends on the state of the pseudorandom generator.

In some implementations, the symmetric key, the initialization vector, or the public component, or any suitable combination of them, can be generated based on the random value produced by a pseudorandom generator. In some instances, one or more of the symmetric key, the initialization vector, or the public component is generated based directly on the random value. For example, all or part of the random value can be used as the symmetric key and/or as the initialization vector in an RSA-based hybrid encryption scheme. As another example, the random value can be used as an input in a function that produces the symmetric key, the initialization vector, and/or the public component. In some instances, one or more of the symmetric key, the initialization vector, or the public component is generated based indirectly on the random value. For example, the symmetric key, the initialization vector, and/or the public component can be generated based on another value that has been generated based on the random value.

Figure 1:
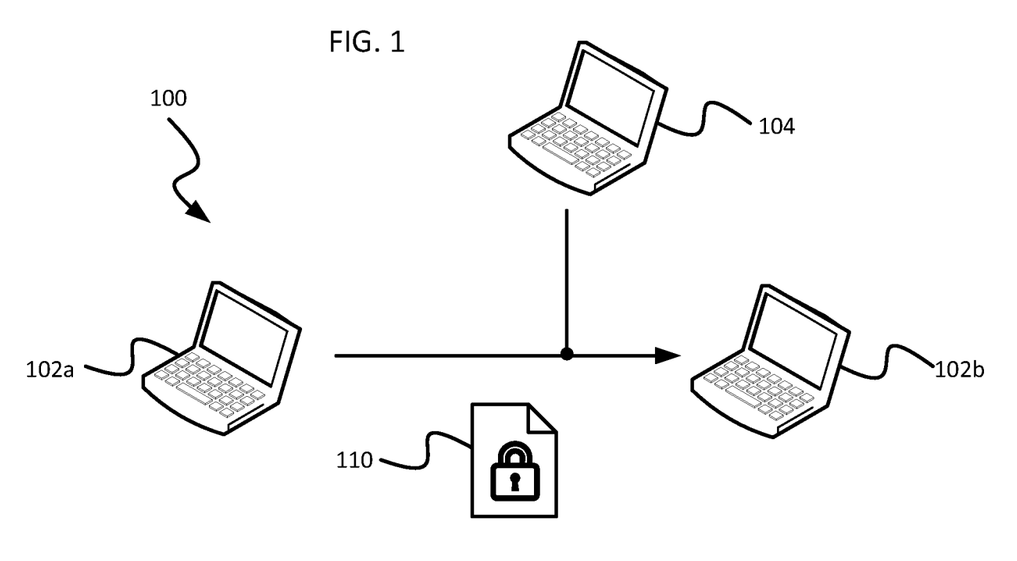
FIG. 1 is a schematic diagram of an example data communication system.

FIG. 1 is a schematic diagram of an example data communication system 100. The data communication system 100 includes a first terminal 102a, a second terminal 102b, and an adversary terminal 104. The data communication system 100 can include additional, fewer, or different components. For example, the data communication system 100 may include servers, additional terminals, additional networking devices and other features not shown in the figure.

The terminals 102a, 102b, and the adversary terminal 104 can be computing devices or systems that can communicate over data networks or communication links based on communication schemes specified by a cryptography system. The terminals 102a, 102b, the adversary terminal 104 are generally operable to receive, transmit, process, and store information. Although FIG. 1 shows two terminals 102a, 102b, and an adversary terminal 104, a data communication system 100 may include any number of terminals. The data communication system 100 can include groups or subgroups of terminals that can communicate with each other. The data communication system 100 can include terminals of disparate types, having different types of hardware and software configurations, and in a variety of different locations. In some cases, multiple devices or subsystems can be identified together as a single terminal.

The terminals 102a, 102b, 104 typically include a data processing apparatus, a data storage medium, and a data communication interface. For example, the terminals 102a, 102b, and the adversary terminal 104 can include a memory, a data processor, and an input/output controller. A terminal can include user interface devices, for example, a monitor, touchscreen, mouse, trackball or keyboard. The memory of the terminal can store messages and information associated with the cryptography system. For example, a terminal may store public and private key data, digital certificate data, and other types of information. The memory of the terminal can store instructions (e.g., computer code) associated with computer applications, programs and computer program modules, and other resources.

Terminals can include handheld devices such as smart phones, personal digital assistants (PDAs), portable media players, laptops, notebooks, tablets, and others. Terminals can include work stations, mainframes, non-portable computing systems, devices installed in structures, vehicles, and other types of installations. Terminals can include embedded communication devices. For example, the terminals can include messaging devices that are embedded in smart energy meters of a smart energy system. Other types of terminals may also be used.

The terminals $102a$, $102b$ can communicate with each other and with other components of a data communication system over a data network (not shown). In the example shown in FIG. 1, the terminal $102a$ can generate an encrypted message 110 based on a plaintext message and a public key of an entity associated with the terminal $102b$. The terminal $102a$ can send the encrypted message 110 to the terminal $102b$. The terminal $102b$ can decrypt the encrypted message 110 based on a private key of the entity associated with the terminal $102b$. The adversary terminal 104 can observe the public communications between the terminals $102a$, $102b$, and the adversary may launch an attack that is designed to discover or exploit vulnerabilities in the encryption scheme. For example, the adversary terminal 104 may perform a key collision attack or another type of attack. In some instances, the terminals $102a$, $102b$ employ one or more countermeasures that prevent, or substantially reduce the likelihood of, a successful attack by the adversary terminal 104.

The encrypted message 110 can include a ciphertext message generated by the terminal $102a$ according to a hybrid encryption scheme. The hybrid encryption scheme can use a symmetric key encryption algorithm. In a symmetric key encryption algorithm, the same secret value is used by the message sender to encrypt the message and by the message recipient to decrypt the message. In some examples, E: $\{0,1\}^{\kappa} \times \{0,1\}^{*} \to \{0,1\}^{*}$ can be a symmetric key encryption function $E(k,M)=C$, where k is a $\kappa$-bit symmetric key, M is the input plaintext message that includes one or more plaintext blocks, and C is the output ciphertext.

The symmetric key encryption function E can utilize an initialization vector (IV). The initialization vector can be a public or private value that is r bits long. Generally, a deterministic function may produce the same ciphertext for a given plaintext. An initialization vector can be used to vary the ciphertext produced by the deterministic function. In some instances, the initialization vector may to provide a security property sometimes referred to as "indistinguishability." Indistinguishability can refer to a situation where, given two plaintexts and an encryption of one of the two plaintexts, the identity of the encrypted plaintext (i.e., which of the two plaintexts has been encrypted) cannot be determined with greater than fifty percent probability. In some cases, an initialization vector may be referred to as a "nonce" (i.e., a number that is used once).

Hybrid encryption schemes can generate the symmetric key for the symmetric key encryption function based on a public-key and private-key pair. For example, the message sender can generate the symmetric key based on the message recipient's public key, and the message recipient can generate the symmetric key based on the message recipient's private key. As a particular example, let pk represent a public key and $\epsilon$ represent a public key encryption function. To encrypt long messages, a symmetric key K can be encrypted using the expensive public key operation $c_1=\epsilon(pk, K)$, and K can then be used to encrypt a (possibly long) encrypted message $c_2=E(K, M)$. The overall output can be represented $(c_1,c_2)$. In some cases, hybrid encryption is also referred to as KEM/DEM, since $c_1$ can be produced by a key encapsulation method (KEM) and $c_2$ can be produced by a data encapsulation method (DEM).

An example hybrid encryption scheme, ECIES, can be described in terms of the following framework. Let G be a generator of the elliptic curve group G used to implement ECIES, having prime order n. The KEM step can take the recipient's public key A=aG and a parameter keyLen as input, then proceeds as follows: 1) Choose a random integer $r\in[1, \ldots, n]$; 2) Compute $c_1=rG$; 3) Compute $K=KDF(rA)=KDF(raG)$, where KDF: $G \to \{0,1\}^{keyLen}$ is a key derivation function; and 4) Output from the KEM the public component $c_1$, and a private component K. The DEM step takes K and a plaintext message M as input to be encrypted. The message M is encrypted as $c_2=E_K(M)$, where E is a symmetric key encryption function, such as, for example, the advanced encryption standard in cipher block chaining mode (AES-CBC). The output from the DEM can include the public component $c_2$. The output of ECIES can be represented $(c_1,c_2)$. In some implementations, keyLen is the length of two symmetric keys, an encryption key and a MAC (message authentication code) key ($K_1$ and $K_2$, respectively), and the DEM outputs a third component $c_3=MAC_{K_2}(c_2)=MAC_{K_2}(E_{K_1}(M))$. The second component $c_2$ can provide confidentiality, and the third component $c_3$ can provide authenticity. For example, when both the second component $c_2$ can and the third component $c_3$ are provided to the message recipient, the second component $c_2$ can be used to recover the message, and the third component $c_3$ can allow the recipient to verify that the message has not been altered (e.g., by an adversary or otherwise).

Another example hybrid encryption scheme, based on RSA, can be described in terms of the following framework. Let (N, e) be an RSA public key. The integer N is a large composite number having two prime factors p and q, (i.e., N=pq). The encryption exponent e is a small integer (e.g., 3, $2^{16}-1$, etc.). The input to the KEM is (N, e) and a parameter keyLen. The KEM then proceeds as follows: 1) Choose $K\in_R \{0,1\}^{keyLen}$; 2) Encode K as an integer in $\mathbb{Z}_n$ and compute $c_1=K^e$ (mode N); and 3) Output a public KEM component $c_1$ and a private component K. The DEM step can take K as input and a plaintext message M to be encrypted. The message M can be encrypted as $c_2=E_K(M)$. The output from the DEM can be represented $c_2$. As in the ECIES scheme, a MAC component may be added.

Key collision attacks may be performed by the adversary terminal 104 on the encrypted message 110. An example key collision attack on block ciphers with $\kappa$-bit keys can be described as follows. The attack is generic in that it treats the encryption function as a black box. Informally, the attacker begins by collecting a large number of ciphertexts that are the encryption of a partially known plaintext under different keys. Then the attacker chooses random keys and encrypts the known portion of the plaintext until finding a match with one of the ciphertexts collected in the first step. Once the attacker finds a match, with high probability the key used to create both ciphertexts is the same, and the attacker may decrypt the remaining part of the matching ciphertext (which corresponds to the unknown portion of the plaintext). Since this is a type of birthday attack on the keyspace, the complexity is $O(2^{\kappa/2})$ time and space. This example attack allows one of roughly $O(2^{\kappa/2})$ ciphertexts to be decrypted, but does not allow the attacker to choose which ciphertext will be decrypted.

An example key collision attack applied to the block cipher DES is provided by E. Biham in "How to Forge DES-Encrypted Messages in 2^28 Steps," Technion Department of Computer Science Technical Report Number CS0884-1996, 1996. Additional information about example key collision attacks is provided by M. E. Hellman in "A Cryptanalytic Time-Memory Trade-Off," IEEE Transactions on Information Theory 26 (1980), pages 401-406.

Key collision attacks are possible, for example, where each time an encrypted message 110 is created, a different symmetric key is used. Key collision attacks can also be used in other conditions. Key collision attacks are also called "time-memory trade-off attacks." The attack may be mounted by the adversary terminal 104 based on the symmetric key encryption function E, by ignoring the KEM component of the ciphertext ($c_1$), whenever the DEM is deterministic or poorly randomized, for example, when the IV is constant or is of low-entropy or in other instances. Some conventional key collision attacks could potentially be launched against a hybrid encryption scheme.

The key collision attack may treat the initialization vector and the symmetric key as an r+κ bit key. The complexity of the attack can increase from $O(2^{\kappa/2})$ when the initialization vector is a constant, to $O(2^{(r+\kappa)/2})$ when the initialization vector is not constant. Suppose the initialization vector has an entropy of r bits. To neutralize the attack, the entropy can be set to r=κ. For most modes of operation (e.g., counter (CTR), cipher block chaining (CBC), cipher feedback (CFB), counter with CBC MAC (CCM), Galois/Counter Mode (GCM)), r is equal to the block length. Therefore, with at least some versions of the Advance Encryption Standard (AES), r can be 128, providing security when κ=128. In some cases, when the initialization vector has $r_0$<r bits of entropy, the cost of the attack drops to $O(2^{(r_0+\kappa)/2})$.

Similar to the case when the initialization vector has low entropy, when the first plaintext block is not known, but has a low entropy of $t_0$,bits the key collision attack may run with complexity $O(2^{(t_0+\kappa)/2})$, which can be better than a brute force attack for $t_0$<κ. The complexity $O(2^{(t_0+\kappa)/2})$ is obtained by treating the unknown first block as part of the symmetric key. That is, instead of guessing a key in $\{0,1\}^\kappa$ when forming, a dictionary of ciphertexts for the key collision attack, a value in $\{0,1\}^\kappa \times M$ is estimated, for some set M of possible first plaintext blocks, having size $2^{t_0}$. In some cases, with some modes of operation, (e.g., counter mode or ECB mode) the attack may be mounted by an adversary terminal that may know any fixed plaintext blocks instead of just the first plaintext blocks. This may be possible since in these modes all blocks are independent.

A key collision attack and similar types of attacks against a hybrid encryption scheme may be practical for an adversary in various circumstances. For example, certain attacks may be useful where the first block of an encrypted message is a standard protocol header, either public or having low-entropy. As another example, while most users would never produce $2^{\kappa/2}$ ciphertexts under different keys, a group of $2^{20}$ users may, and an attacker observing a large network could potentially observe sufficient ciphertexts to succeed. The attack may still be performed with fewer than $2^{\kappa/2}$ ciphertexts at the expense of additional computation. A group of ciphertexts ($L_1$) used by the adversary may be created with different public keys, and by different parties, making it easier for the adversary to observe a sufficient number of them. For applications with strict security requirements, creating $2^b$ ciphertexts may reduce collective security by b bits, which may cause the application to miss its stated security goal. The storage that is used in the attack may not need to be fast (e.g., it may be cheaper disk instead of more expensive memory), and both storage and computation may be efficiently parallelized. Attacks may be considered practical or otherwise useful in additional or different scenarios as well.

In particular, there may be instances where standardized hybrid encryption schemes (and variants thereof) are vulnerable to key collision attacks. For example, an attack may be effective against some standards with time and space $O(2^{\kappa/2})$ (or an allowable tradeoff).

Some versions of SECG standards may be vulnerable to key collision attacks in certain instances. The SEC 1 standard (e.g., the SEC 1 standard specified in "Standards for Efficient Cryptography, SEC 1: Elliptic Curve Cryptography," Version 2.0, dated May 21, 2009) specifies an example implementation of ECIES. In some current versions of the SEC 1 standard, the initialization vector or initial counter is allowed to be zero for ECIES, and it is recommended that all initialization vectors are zero, which makes the DEM deterministic in this case. The XOR symmetric key encryption mode may be secure against this attack.

Some versions of ISO 18033-2 may be vulnerable to key collision attacks in certain instances. ISO 18033-2 specifies multiple hybrid public key encryption (PKE) schemes, and specifies that the initialization vector used in the symmetric component can be a string of zero bytes. The XOR symmetric key encryption (SC2) mode may be secure against this attack. The attack applies equally to any of the KEMs specified in ISO 18033-2, including the RSA-based methods.

Some versions of IEEE 1363 may be vulnerable to key collision attacks in certain instances. IEEE 1363a (amendment specifying additional techniques) specifies various Diffie-Hellman integrated encryption scheme (DHIES)-like hybrid encryption schemes, and includes ECIES. The symmetric key algorithms that may be used as a DEM: 3DES-CBC-IV0 and AESCBC-IV0 are also specified. A constant initialization vector is also specified. Accordingly, the techniques in IEEE 1363a may be vulnerable to key collision attacks.

Some versions of RFC 5091 may be vulnerable to key collision attacks in certain instances. RFC 5091 describes how to use the Boneh-Franklin (BF) and Boneh-Boyen 1 (BB1) identity-based encryption (IBE) schemes. The standard describes how to encrypt a session key (i.e., a KEM). The attack may be possible if a deterministic DEM is used (e.g., if one of the DEMs from SEC1, or ISO 18033-2 is used with the KEM described in RFC 5091).

Some versions of PKCS#1 may be vulnerable to key collision attacks in certain instances. Similar to RFC 5091, the PKCS#1 standard specifies a KEM, based on RSA. There are at least two variants, RSAES-PKCS1-v1_5, and RSAES-OAEP. If implementations use, e.g., RSAES-OAEP to encrypt a κ-bit symmetric key k and use k with a deterministic DEM, then they key collision attack may have complexity $O(2^{\kappa/2})$.

Some versions of other hybrid encryption proposals may be vulnerable to key collision attacks in certain instances. There are several PKE schemes based on the KEM/DEM paradigm. One example scheme which may be vulnerable to the attacks is the HOMQV scheme, when it is used with a deterministic DEM component.

Some versions of S/MIME and CMS may be vulnerable to key collision attacks in certain instances. The S/MIME (secure multipart message encoding) and CMS (RFC 5652, cryptographic message syntax) standards specify (highly flexible) ways of encrypting content for one or multiple recipients. CMS standards follow the KEM/DEM paradigm, where the KEM is called "key encryption" and the DEM is called "content encryption." Using deterministic DEMs may allow the hybrid attack as described above. For example, using RSA-KEM (RFC 5990) with a deterministic DEM (AES-CBC with a fixed initialization vector), may be vulnerable to the key collision attack.

The techniques described below (e.g., those described with respect to FIGS. 2, 3, 4, 5, and 6) and variations thereof may be used in a hybrid encryption scheme as countermeasures against key collision attacks. Accordingly, the security of the above-described cryptography systems may be improved based on one or more of the countermeasures described below. In addition to the example implementations described here, the countermeasures described below can be adapted for other suitable hybrid encryption schemes. The countermeasures described below may be combined or modified, as appropriate. In some instances, one or more of the techniques described below can be applied to modify a standard. For example, some of the techniques described here can be applied to ECIES as specified in SEC 1, to two identity-based encryption (IBE) schemes from RFC 5091, and others.

Figure 2:
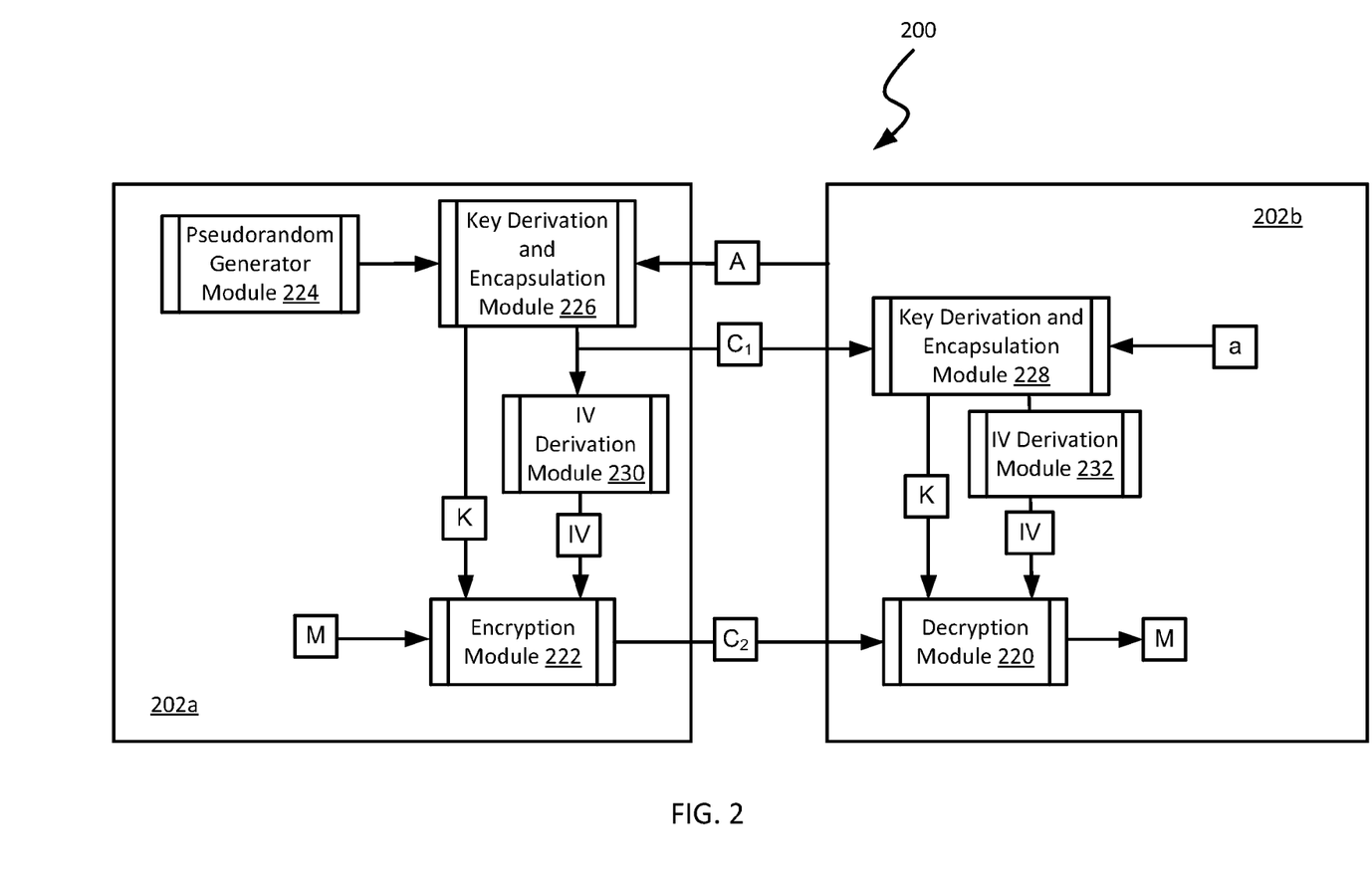
FIG. 2 is a schematic diagram of an example cryptography system with an example countermeasure.

FIG. 2 is a schematic diagram of an example cryptography system 200 with an example countermeasure. The example cryptography system 200 includes a terminal module 202$a$ and a terminal module 202$b$. The cryptography system 200 can include additional or different components. The terminal modules 202$a$, 202$b$ can each be computer program modules implemented by one or more terminals, servers, or other types of computing systems. For example, the terminal modules 202$a$, 202$b$ can be implemented by the terminals 102$a$, 102$b$ of FIG. The terminal modules 202$a$, 202$b$, can be implemented by additional or different types of hardware systems.

The terminal modules 202$a$, 202$b$ can communicate with each other, for example, over a data network or another type of communication link. In the example shown in FIG. 2, the terminal module 202$a$ includes an encryption module 222, a pseudorandom generator module 224, a key derivation and encapsulation module 226, and an IV derivation module 230. The terminal module 202$b$ includes a key derivation module 228, a decryption module 220, and an IV derivation module 232. The terminal modules 202$a$, 202$b$ can include additional or different components.

In the example shown in FIG. 2, the terminal module 202$a$ sends an encrypted message to the terminal module 202$b$. The terminal module 202$a$ can receive a public key A from the terminal module 202$b$. In some implementations, the terminal module 202$a$ can receive the public key A from another source, for example, from a certificate authority. The public key A can be an elliptic curve point or another type of public key value. The public key A corresponds to a private key $a$. For example, in the ECIES example, the public key A of the terminal module 202$b$ is related to the terminal module's 202$b$ private key $a$ by the relationship A=$a$G, where G represents a generator point.

The public key A is provided as an input to the key derivation and encapsulation module 226. The pseudorandom generator module 224 produces a random value, which is provided as an input to the key derivation and encapsulation module 226. For example, the pseudorandom generator module 224 can generate a random integer r∈[1, . . . , n] and provide the random integer r to the key derivation and encapsulation module 226. The random value can be obtained from another source, for example, from a pseudorandom generator outside the terminal module 202$a$. Based on the public key A and the random integer r, the key derivation module 226 can compute a private component K and a public component $c_1$. The private component K can be computed using a key derivation function. The key derivation function may have the form K=KDF(rA) or another form. The key derivation function may accept additional or different inputs, and may produce additional or different outputs, as appropriate. The private component K can be provided to the encryption module 222, and the encryption module 222 can use the private component K as a symmetric key for a symmetric key encryption function.

The key derivation and encapsulation module 226 can compute the public component $c_1$ based on the random value produced by the pseudorandom generator module 224. For example, the public component $c_1$ can be computed as $c_1$=rG or in another manner. The public component $c_1$ is provided as an input to the key derivation and encapsulation module 228, and the IV derivation module 232 of the second terminal module 202$b$. The public component $c_1$ is also provided as an input to the IV derivation module 230 of the first terminal module 202$a$.

The IV derivation module 230 generates the initialization vector IV based on the random value r, for example, by deriving the initialization vector IV from the public component $c_1$. The public component $c_1$ can have high entropy, for example, to achieve a specified level of security in the hybrid encryption scheme. As such, a high-entropy initialization vector IV can be derived from the public component $c_1$. Use of the high-entropy initialization vector in the symmetric key encryption function executed by the encryption module 222 may improve the security of the hybrid encryption scheme, for example, against key collision attacks. In some examples, based on the input $c_1$=rG, the IV derivation module 230 can use least significant bits of the binary representation of rG as the initialization vector. Additionally or alternatively, the IV derivation module 230 can derive the initialization vector from rG using a hash function. The initialization vector IV produced by the IV derivation module 230 is provided as an input to the encryption module 222.

In some examples, the IV derivation module 230 derives the initialization vector from a binary representation of an elliptic curve point (e.g., the public component $c_1$=rG, or another type of elliptic curve point). In some instances, the least significant bits are extracted from the binary representation and used as the initialization vector. The initialization vector can be based on additional or different bits (e.g., other than the least significant bits) from the binary representation of the elliptic curve point.

A binary representation can be generated according to any suitable technique. For example, the curve point can be converted to an octet string representing the (possibly compressed) point. An "octet" can be a group of eight bits, which may be interpreted as an 8-bit unsigned integer. The octet string can be converted to a bitstring. Converting an octet string to a bitstring can be accomplished, for example, by concatenating the octets together (in order) to form the bitstring. Point compression may be used. For example, the compressed y-coordinate can be placed in the leftmost octet of the octet string along with an indication that point compression is being used. The x-coordinate can be placed in the remainder of the octet string. If point compression is not being used, the leftmost octet can indicate that point compression is not being used, and the remainder of the octet string can contain the x-coordinate followed by the y-coordinate.

The encryption module 222 can access the private component K, the initialization vector IV, and a message M and produce an encrypted message $c_2$. In some cases, the encrypted message $c_2$ can be produce by a symmetric key encryption function $c_2=E_K(M)$. The outputs from the terminal module 202a can be represented $(c_1,c_2)$. The outputs can be transmitted, together or separately, over a public or private channel to the terminal module 202b. In the example implementation shown in FIG. 2, the initialization vector IV is derived from the public component $c_1$. Accordingly, the initialization vector IV can also be considered a public value that would be available, for example, to an adversary in some instances.

After receiving the public component $c_1$, the key derivation and encapsulation module 228 of the terminal module 202b can compute the private component K and the initialization vector IV. The key derivation and encapsulation module 228 can use its private key a to derive the private component K from the public component $c_1$. The private component K can be computed using a key derivation function. For example, the key derivation function may have the form $K=KDF(ac_1)$ or another form. In some examples, based on the input $c_1$, the IV derivation module 232 of the terminal module 202b can derive the initialization vector IV using the same technique used by the IV derivation module 230. For example, the IV derivation module 232 can use least significant bits of the binary representation of $c_1$ as the initialization vector, the IV derivation module 232 can derive the initialization vector from $c_1$ using a hash function, or by another technique.

The private component K, the initialization vector IV, and the encrypted message $c_2$ are provided as inputs to the decryption module 220. The decryption module 220 uses the private component K as a symmetric key to decrypt the encrypted message $c_2$. For example, the decryption module can execute an appropriate symmetric key decryption function that produces the plaintext message M.

The countermeasures described with regard to FIG. 2 and variations thereof may be applied to various standards. Some of the techniques described here can be applied to modify the ECIES technique set forth in the SEC 1 standard (e.g., the SEC 1 standard specified in "Standards for Efficient Cryptography, SEC 1: Elliptic Curve Cryptography," Version 2.0, dated May 21, 2009). For example, an initialization vector can be generated from the octet string $\overline{R}$ created in Step 2 in Section 5.1.3 of the SEC 1 standard. Here, $\overline{R}$ is an octet string that represents an elliptic curve point $R=kG$, where k is an ephemeral private key, and G is a generator point of an elliptic curve group. The initialization vector can be generated for decryption in Section 5.1.4 of the SEC 1 standard. For example, the initialization vector can be generated after the octet string R is recovered in Step 1 of Section 5.1.4. The initialization vector can be used in Step 9 for the symmetric key derivation. The countermeasures described with regard to FIG. 2 and variations thereof may be applied to other standards as well.

Figure 3:
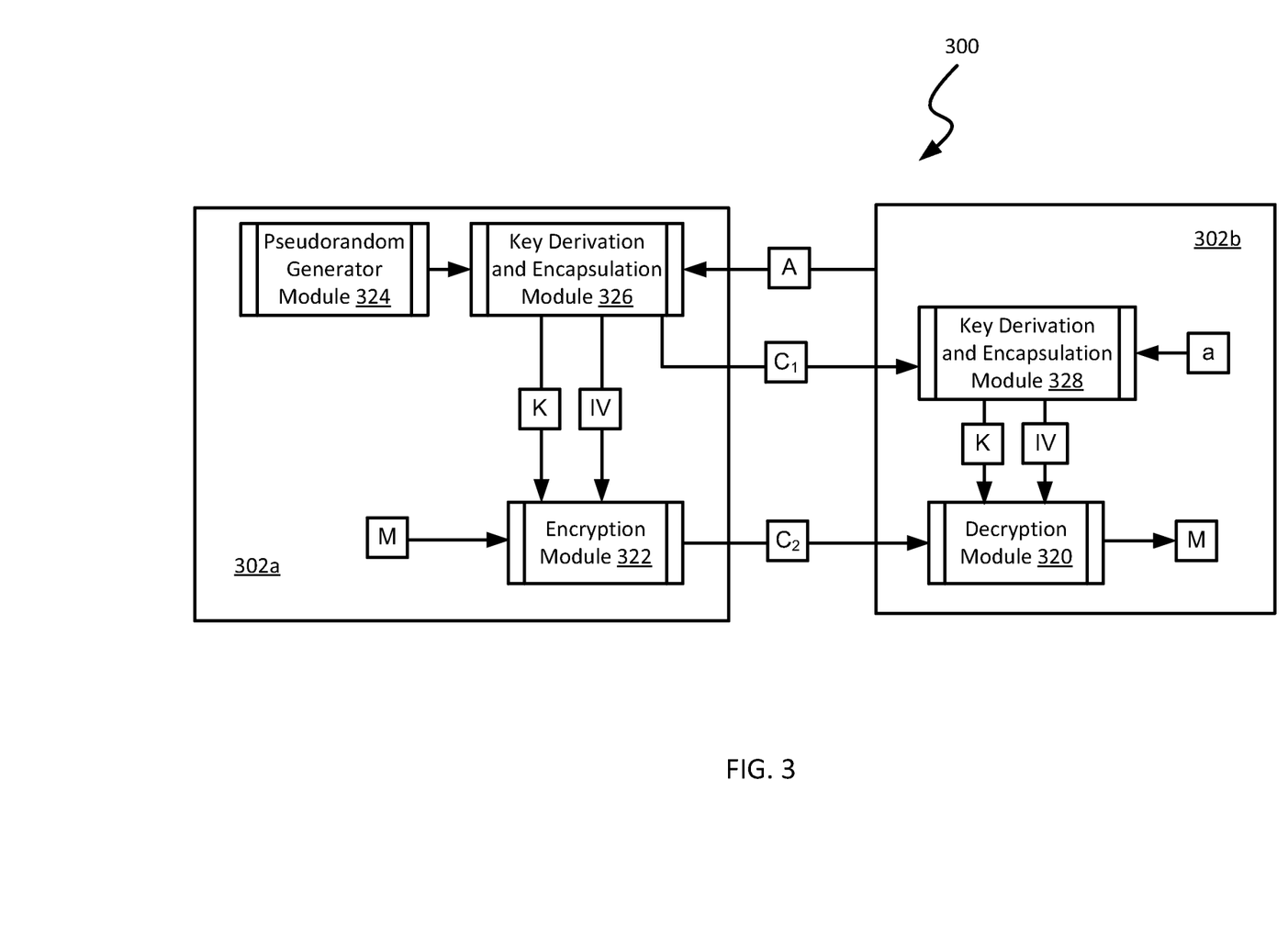
FIG. 3 is a schematic diagram of another example cryptography system with another example countermeasure.

FIG. 3 is a schematic diagram of another example cryptography system 300 with another example countermeasure. The example cryptography system 300 includes a terminal module 302a and a terminal module 302b. The cryptography system 300 can include additional or different components. The terminal modules 302a, 302b can each be computer program modules implemented by one or more terminals, servers, or other types of computing systems. For example, the terminal modules 302a, 302b can be implemented by the terminals 102a, 102b of FIG. The terminal modules 302a, 302b, can be implemented by additional or different types of hardware systems.

The terminal modules 302a, 302b can communicate with each other, for example, over a data network or another type of communication link. In the example shown in FIG. 3, the terminal module 302a includes an encryption module 322, a pseudorandom generator module 324, and a key derivation and encapsulation module 326. The terminal module 302b includes a key derivation and encapsulation module 328, and a decryption module 320. The terminal modules 302a, 302b can include additional or different components.

The public key A is provided as an input to the key derivation and encapsulation module 326. The pseudorandom generator module 324 produces a random value, which is provided as an input to the key derivation and encapsulation module 326. For example, the pseudorandom generator module 324 can generate a random integer $r \in [1, \ldots, n]$ and provide the random integer r to the key derivation and encapsulation module 326. The random value can be obtained from another source, for example, from a pseudorandom generator outside the terminal module 302a. Based on the public key A and the random integer r, the key derivation and encapsulation module 326 can compute a private component K, a public component $c_1$, and an initialization vector IV. The key derivation and encapsulation module 326 can compute the public component $c_1$ based on the random value produced by the pseudorandom generator module 224. For example, the public component $c_1$ can be computed as $c_1=rG$ or in another manner.

The private component K and the initialization vector IV are generated based on the random value produced by the pseudorandom generator module 324. In some cases, the private component K and the initialization vector IV can be computed using a key derivation function. In some examples, the keyLen parameter of the key derivation function can be increased, so that the KEM can output more key material for the DEM performed by the encryption module 322. Some of the additional key material may be used as the initialization vector, and can be sent to the encryption module 322 to perform DEM. The initialization vector IV may remain secret. For example, in some implementations, the initialization vector IV is not made available on public channels, and it can only be computed based on private data (e.g., the private key a, or the random value r).

In some examples, the key derivation function has the form $X=KDF(rA)$ or another form. The key derivation function may accept additional or different inputs, and may produce additional or different outputs, as appropriate. The private component K and the initialization vector IV can be derived from the output X from the key derivation function KDF. For example, the key derivation function can produce a longer output than is needed for the private value K, and the additional output can be used as the initialization vector IV.

The private component K and the initialization vector IV can be provided as inputs to the encryption module 322, and the encryption module 322 can use the private component K as a symmetric key for a symmetric key encryption function. In some cases, the encrypted message $c_2$ can be produced by a symmetric key encryption function $c_2=E_K(M)$. The outputs from the terminal module 302a can be represented $(c_1,c_2)$. The outputs can be transmitted, together or separately, over a public or private channel to the terminal module 302b. The countermeasures shown in FIGS. 2 and 3 can be implemented without increasing the size of the ciphertext output from the encryption module 322. For example, since the terminal module 302b can compute the private component K from the public component $c_1$, the terminal module 302b can also compute the initialization vector IV.

The key derivation and encapsulation module 328 of the second terminal module 302b can produce the private component K and the initialization vector IV based on the public component $c_1$ and the private key a. In some cases, the private component K and the initialization vector IV can be computed using a key derivation function. In some instances, the key derivation and encapsulation module 328 can use the same technique that was used by the key derivation and encapsulation module 326 to derive the private component K and the initialization vector IV from the output of the key derivation function. For example, the key derivation function may have the form $X=KDF(ac_1)$ or another form. The private component K and the initialization vector IV can be derived from the output X from the key derivation function KDF.

After receiving the encrypted message $c_2$, the private component K, and the initialization vector IV, the decryption module 320 of the second terminal module 302b can generate the plaintext message M. The decryption module 320 uses the private component K as a symmetric key to decrypt the encrypted message $c_2$. For example, the decryption module can execute an appropriate symmetric key decryption function that produces the plaintext message M.

The technique shown in FIG. 3 and variations thereof can be applied to RSA-based hybrid encryption schemes. For example, a random initialization vector IV may be encrypted along with K, since in practice, K may be smaller (typically 128 to 256 bits) than N (typically 1024 to 3072 bits). In the RSA-based hybrid encryption scheme, the public component $c_1$ can generated based on the random value produced by the pseudorandom generator module 324 and based additionally on the public key (e, N). In some cases, the random value r produced by the pseudorandom generator 324 includes both the private component K and the initialization vector IV; and the public component $c_1$ can be generated based on the random value by computing the public component $c_1$ based on $K^e$. In some cases, the random value r produced by the pseudorandom generator 324 includes only the private component K. In such cases, the public component $c_1$ can be generated based on the random value by deriving the public component $c_1$ from $K^e$; and the initialization vector IV can be generated based on the random value by deriving the initialization vector IV from $K^e$. Additional or different techniques can be used in RSA-based hybrid encryption schemes.

The technique shown in FIG. 3 and variations thereof can be applied to various standards. Some aspects of the technique shown in FIG. 3 can be applied to improve the ECIES technique set forth in the SEC 1 standard (e.g., the SEC 1 standard specified in "Standards for Efficient Cryptography, SEC 1: Elliptic Curve Cryptography," Version 2.0, dated May 21, 2009). For example, in the encryption operation at Step 5 in Section 5.1.3 of SEC 1, an initialization vector (in addition to enckey and mackey) can be generated using the key derivation function KDF. This initialization vector can be used when encrypting the message M under the symmetric encryption key EK. This can apply to all of the block-cipher based symmetric key encryption schemes (e.g., those listed in Section 3.8) of the SEC 1 standard. The length of the initialization vector may depend on the symmetric key encryption method used. For example, initialization vector can be 128 bits long for the AES-based DEMs. The initialization vector can be generated for decryption in Section 5.1.4 of the SEC 1 standard. For example, the initialization vector can be generated during Step 6 of Section 5.1.4. The initialization vector can be used in Step 9 for the symmetric key derivation.

Some implementations of ECIES may proceed with entities U and V, where entity U encrypts a message and sends the encrypted message to entity V. Entity V receives and decrypts the encrypted message. During setup, entity V can establish which symmetric key encryption schemes to use, and select any options involved in the operation of the encryption scheme. ENC can denote the encryption scheme chosen, enckeylen can denote the length in octets of the keys used by ENC, and ivlen can denote the length in octets of the IV used by ENC.

In some implementations of ECIES, successful key collision attacks may be prevented by randomizing the symmetric component of the hybrid encryption scheme. When a block cipher is used for symmetric encryption, the symmetric component can be randomized by using a random initialization vector (IV) in the cipher block chaining (CBC) mode or a random initial counter block (ICB) in counter (CTR) mode. In some version of ECIES, the IV (or ICB) can be generated from the shared secret while generating the encryption key and MAC key. For example, a 64-bit initialization vector can be computed for the Triple Data Encryption Standard (TDES) in CBC mode, a 128-bit initialization vector can be computed for the Advanced Encryption Standard (AES) in CBC mode, or a 128-bit ICB can be computed for AES in CTR mode. These and other operations may help to ensure that the symmetric key encryption operation is adequately randomized, in some cases. In some implementations, neither the IV nor the ICB is transmitted as part of the ciphertext. For example, the IV or the ICB (as appropriate) may be derived by the recipient V as part of the decryption algorithm.

Some implementations of ECIES may use an encryption procedure that includes one or more of the following operations performed by the entity U. The key derivation function KDF established during the setup procedure can be used to generate keying data K of length enckeylen+mackeylen+ivlen octets from Z and [SharedInfo$_1$]. Here, Z is an octet string representing a shared secret field element $z \in F_q$ from the ephemeral secret key k and V's public key $Q_V$ obtained during a key deployment procedure (e.g., using an appropriate Diffie-Hellman procedure, or another technique). The keying data K may be parsed as EK∥MK∥IV where EK is an encryption key of length enckeylen octets, MK is a MAC key of length mackeylen octets and IV is an initialization vector of length ivlen octets. The encryption operation of the symmetric encryption scheme ENC established during the setup procedure can be used to encrypt M under EK as ciphertext EM. ENC may use the value IV as an initialization vector. Similar operations may be applied by the entity V during the decryption procedure, as appropriate. For example, the value IV can be derived during the decryption procedure using operations that are the same as or similar to those described above for the encryption procedure. The decryption operation of the symmetric encryption scheme ENC can be used to decrypt EM under EK. The value IV can be used as the initialization vector for the decryption operation.

The ISO 18033-2 standard presents multiple hybrid encryption schemes using the KEM/DEM paradigm. There are three DEMs in the standard: DEM1: variable length data encapsulation method with a variable length label; DEM2: variable length data encapsulation method with a fixed length label; and DEM3: a fixed plaintext length DEM.

Implementers of ISO 18033-2 can choose a symmetric encryption method. One of the symmetric encryption methods (SC1) is a CBC mode encryption, for one of the block ciphers in ISO/IEC 18033-3, with a fixed IV (see 6.5.2.2, Step (f)). A key collision attack may be used against SC1, for example, when it is used with DEM1 or DEM2.

Section 6.5.2.2 of ISO 18033-2 defines SC1. It can be modified to use an IV. This may be done by increasing the KeyLen parameter to include an the length of an IV, then parse the input key to SC1 into a key and IV. For example, SCl.KeyLen=BC.KeyLen+BC.IVLen, where BC is a chosen block cipher. Then a step can be added to the beginning of both SC1.Encrypt and SC1.Decrypt. The added step can parse k as k||IV, where k' is an octet string of length BC.KeyLen and IV is an octet string of length BC.IVLen. Step (f) of the encryption procedure in Section 6.5.2.2 of ISO 18033-2 can be modified to let $c_0$=IV, and for $1 \leq i \leq l$, let $c_i$=BC.Encrypt $(k, M_i \oplus c_{i-1})$. The corresponding change to SC1.Decrypt can be made in Step (b).

For the RFC 5091 standard, the countermeasures described with respect to FIGS. 2 and 3 and variations thereof, may be applied, for example, when the DEM is a block cipher (e.g., AES-CBC). The encryption procedure can be modified as follows, and corresponding changes can also be made to the decryption procedure. For the BF scheme, in the function BFencrypt (§5.4.1), Step 12 encrypts a symmetric key (denoted m) by XORing it with the output of a hash function (essentially performing encryption in stream cipher mode). To implement the countermeasure as described with respect to FIG. 3, the range of the hash function may be extended, or it can be replaced with a KDF, to produce sufficient bytes to additionally generate a random, secret initialization vector. Then, for example, AES-CBC(m, IV, data) may act as a DEM. To implement the countermeasure described with respect to FIG. 2, an initialization vector for the DEM may be formed by taking sufficiently many bytes from one or more of the output components (i.e., one of (U, V, W) output in Step 13). For the BB1 Scheme, the countermeasure described with regard to FIG. 3 may be applied similarly to the BF scheme. In the function BBEncrypt (§6.4.1), when the seed value h' is computed in Step 6(a), a random and secret initialization vector may be additionally generated and output from the sender. To implement the countermeasure as described with regard to FIG. 2, an initialization vector can be formed for the DEM by taking sufficiently many bytes from one or more of the output components (i.e., one of (u, C_0, C_1, y) output in Step 8).

Figure 4:
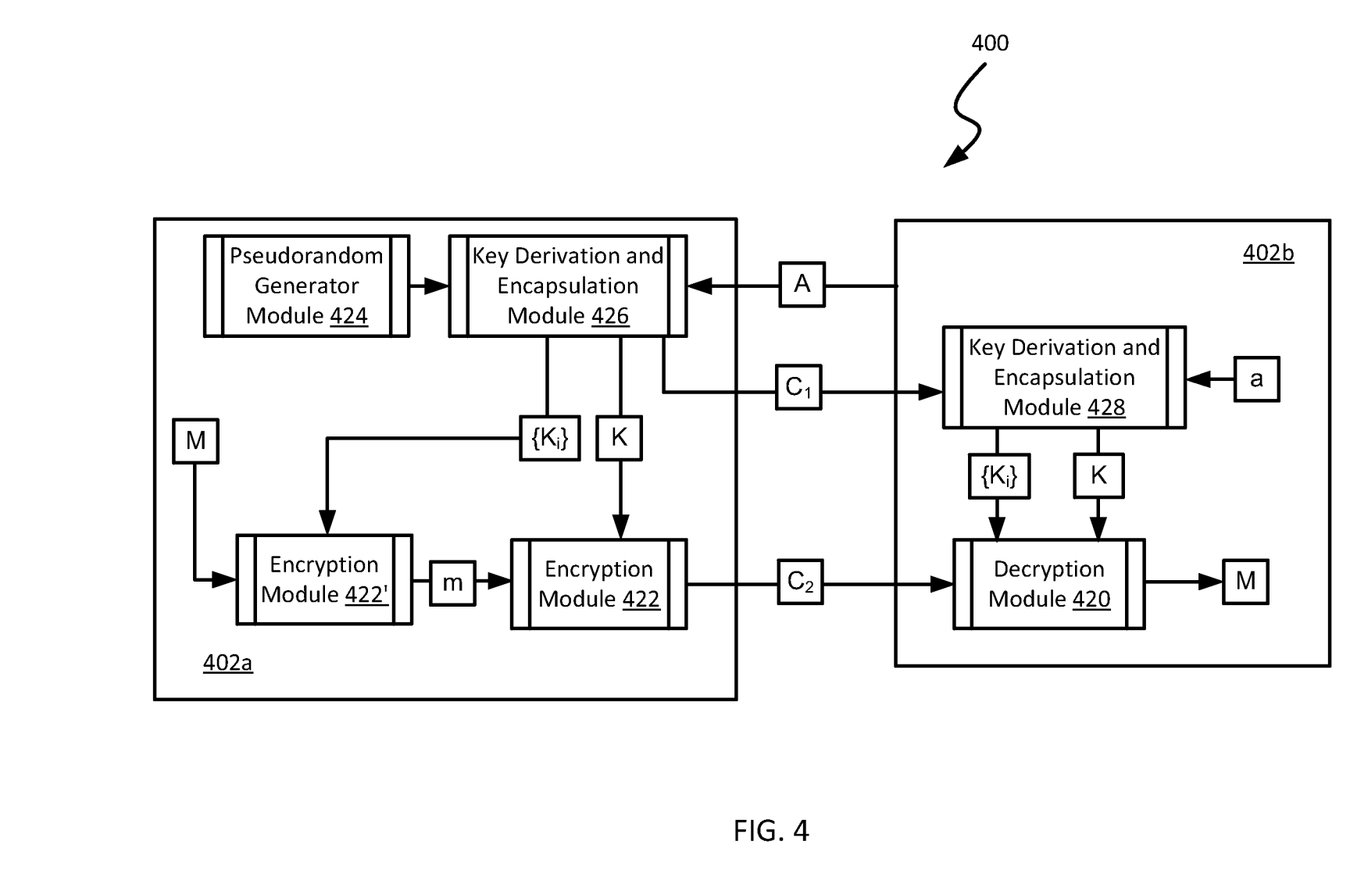
FIG. 4 is a schematic diagram of another example cryptography system with another example countermeasure.
Figure 5:
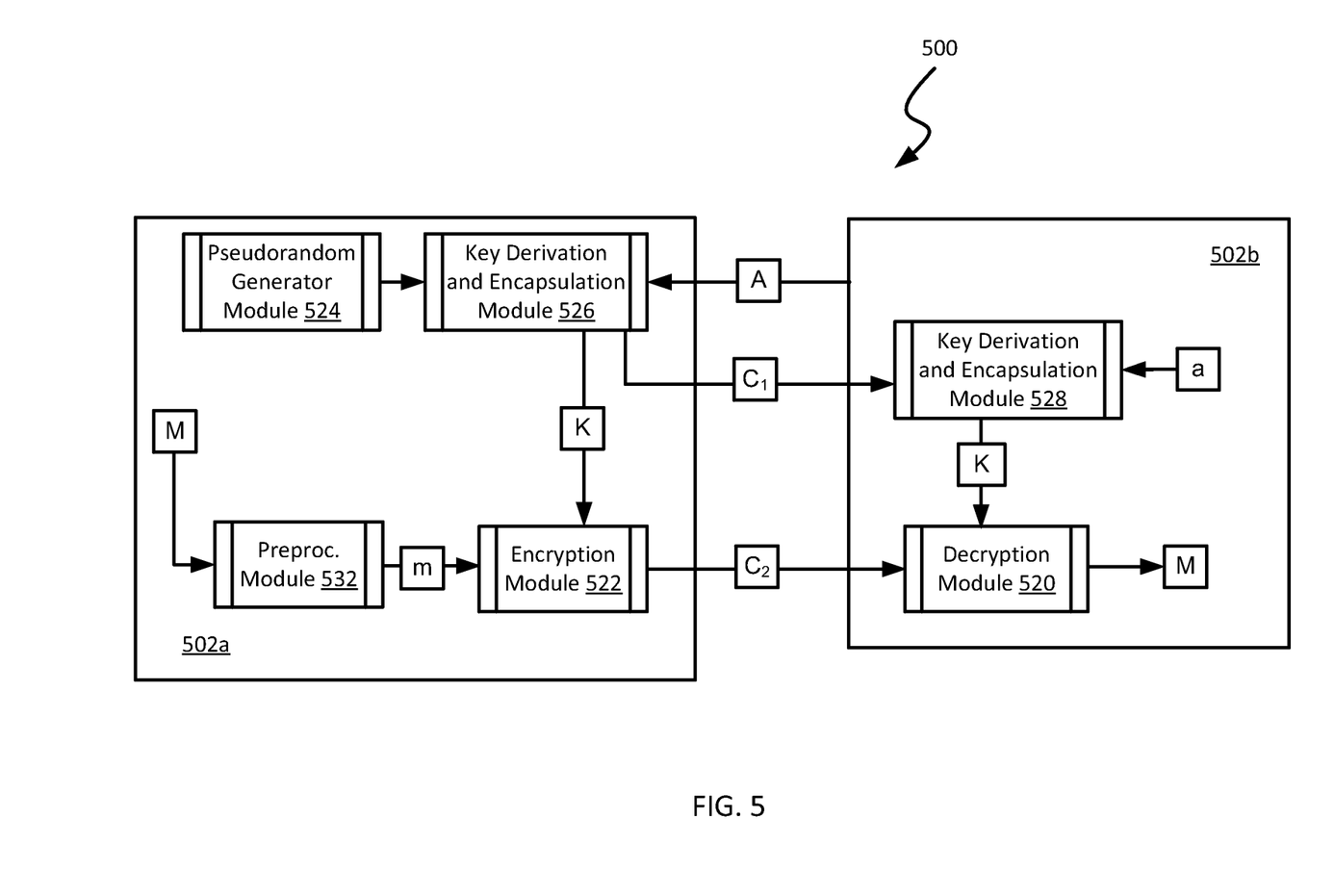
FIG. 5 is a schematic diagram of another example cryptography system with another example countermeasure.

The example cryptography systems 400, 500 shown in FIGS. 4 and 5 can apply a pre-processing step to the plaintext message M. For example, instead of directly encrypting a plaintext message M, some function F can be applied to compute a preprocessed message, m=F(M). Then a hybrid encryption scheme may be used to encrypt m. For decryption, the message M may be decrypted based on M=F$^{-1}$(m). The example cryptography systems 400, 500 can also utilize any suitable initialization vector. For example, the techniques shown in FIGS. 4 and 5 may be combined with one or more of the techniques shown in FIGS. 2 and 3, or another type of initialization vector may be used.

FIG. 4 is a schematic diagram of another example cryptography system 400 with another example countermeasure. The example cryptography system 400 includes a terminal module 402a and a terminal module 402b. The cryptography system 400 can include additional or different components. The terminal modules 402a, 402b can each be computer program modules implemented by one or more terminals, servers, or other types of computing systems. For example, the terminal modules 402a, 402b can be implemented by the terminals 102a, 102b of FIG. The terminal modules 402a, 402b, can be implemented by additional or different types of hardware systems.

The terminal modules 402a, 402b can communicate with each other, for example, over a data network or another type of communication link. In the example shown in FIG. 4, the terminal module 402a includes an encryption module 422, another encryption module 422', a pseudorandom generator module 424, and a key derivation and encapsulation module 426. The terminal module 402b includes a key derivation and encapsulation module 428, and a decryption module 420. The terminal modules 402a, 402b can include additional or different components.

The cryptography system 400 may apply multiple encryption as a countermeasure to key collision attacks. The terminal module 402a can receive a public key A from the terminal module 402b, and input the public key A to the key derivation and encapsulation module 426. In some implementations, the terminal module 402a can receive the public key A from another source, for example, from a certificate authority. The pseudorandom generator module 424 can generate a random integer r and send it to the key derivation and encapsulation module 426. The random value can be obtained from another source, for example, from a pseudorandom generator outside the terminal module 402a. Based on the public key A and the random integer r, the terminal module 402a can perform multiple encryption, which can randomize the encryption function by using additional key material.

The key derivation and encapsulation module 426 can compute a private component K, a public component $c_1$, and additional private components $\{K_i\}$. For example, for double encryption, the additional private component may be expressed as $K_1$. For triple encryption, the additional private component may be expressed as $\{K_1, K_2\}$. Using double encryption as an example, the plaintext message M is first encrypted by the encryption module 422' based on $K_1$ to generate an encrypted message m=$E_{K_1}$(M). The encrypted message m is then input to the encryption module 422 together with the private component K to generate the ciphertext $c_2$=$E_K(E_{K_1}(M))$.

Other multiple encryption schemes may be extended from the double encryption scheme described above. In some cases, two-key triple encryption is sufficient to ensure security. As another example, three-key triple encryption may be used. Triple data encryption standard (DES) is an example of a triple-encryption standard with 112-bit keys (two-key, Option 2) or 168-bit keys (three-key, Option 1). The 168-bit key version can provide up to 84 bits of security. The DES can also be replaced by AES to define triple AES.

The output from the terminal module 402a to the terminal module 402b can be represented as ($c_1$,$c_2$). After receiving $c_1$, the key derivation and encapsulation module 428 included in the terminal module 402b can compute the private component K and the additional private components $\{K_i'\}$ using its private key a and the received public component $c_1$. The private components K' and $\{K_i'\}$ can be provided to the decryption module 420. After receiving the encrypted message $c_2$, the decryption module 420 can generate the plaintext message M based on K' and $\{K_i'\}$.

FIG. 5 is a schematic diagram of another example cryptography system 500 with another example countermeasure. The example cryptography system 500 includes a terminal module 502a and a terminal module 502b. The cryptography system 500 can include additional or different components. The terminal modules 502a, 502b can each be computer program modules implemented by one or more terminals, servers, or other types of computing systems. For example, the terminal modules 502a, 502b can be implemented by the terminals 102a, 102b of FIG. The terminal modules 502a, 502b, can be implemented by additional or different types of hardware systems.

The terminal modules 502a, 502b can communicate with each other, for example, over a data network or another type of communication link. In the example shown in FIG. 5, the terminal module 502a includes an encryption module 522, a pseudorandom generator module 524, a key derivation and encapsulation module 526, and a preprocessing module 532. The terminal module 502b includes a key derivation and encapsulation module 528, and a decryption module 520. The terminal modules 502a, 502b can include additional or different components.

The terminal module 502a can receive a public key A from the terminal module 502b. In some implementations, the terminal module 502a can receive the public key A from another source, for example, from a certificate authority. The pseudorandom generator module 524 can generate a random integer r and provide it to the key derivation and encapsulation module 526. The random value can be obtained from another source, for example, from a pseudorandom generator outside the terminal module 502a. Based on the public key A and the random integer r, the key derivation and encapsulation module 526 can compute a private component K and a public component $c_1$. The public component $c_1$ is sent to the key derivation and encapsulation module 528 included in the terminal module 502b. The private component K is provided to the encryption module 522.

A plaintext message M is input to the preprocessing module 532 to generate a preprocessed message m. In some implementations, an all-or-nothing transform may be used by the preprocessing module 532 to generate the preprocessed message m. The all-or-nothing mode of encryption can have the property that the entire ciphertext must be decrypted before one can determine any plaintext blocks. As such, the entropy of the input plaintext can be evenly spread out across the transformed plaintext. The variable-length encryption modes BEAR and LION can be implemented as all-or-nothing transforms in some instances. Another example all-or-nothing transform is the Optimal Asymmetric Encryption Padding (OAEP) padding scheme and its variants. For a given all-or-nothing transform function F, a preprocessed message, m=F(M) is computed. Then a hybrid encryption scheme may be used to encrypt m. For decryption, the message M may be decrypted based on $M=F^{-1}(m)$.

In some implementations, the plaintext message M may be compressed by the preprocessing module 532 to generate the preprocessed message m. This countermeasure may increase the entropy of the first block of the input plaintext, given that the compression algorithm does not add its own header. Lossless data compression methods such as Lempel-Ziv-Welch (LZW) algorithm or Huffman coding are example compression algorithms performed by the preprocessing module 532. For a given compression function F, a preprocessed message, m=F(M) is computed. Then a hybrid encryption scheme may be used to encrypt m. For decryption, the message M may be decrypted based on $M=F^{-1}(m)$.

In some implementations, the preprocessing module 532 can prepend random padding and use a "feed-forward" mode to generate the preprocessed message m. During encryption, the preprocessing module 532 can transform the plaintext M to M'=r'||M, where r' is a randomly chosen bit string of fixed length. In some implementations, the message M' may be generated by the preprocessing module 532 based on a key derivation function KDF, such as, for example, these described with regard to FIGS. 2 and 3, or other types of KDFs. The "feed-forward" property of a mode of operation is defined as having block j depend on all blocks i<j. In some instances, any change to a previous plaintext block causes changes in the subsequent blocks. Example modes of operation with the feed-forward property can include CBC mode, OFB mode, and the authenticated mode CCM.

The output from the terminal module 502a to the terminal module 502b can be represented as ($c_1,c_2$). After receiving $c_1$, the key derivation and encapsulation module 528 included in the terminal module 502b can compute the private component K based on the private key a and the received public component $c_1$. The key derivation and encapsulation module 528 can provide the private component K to the decryption module 520. After receiving the encrypted message $c_2$, the decryption module 520 can generate the plaintext message M based on K.

Figure 6:
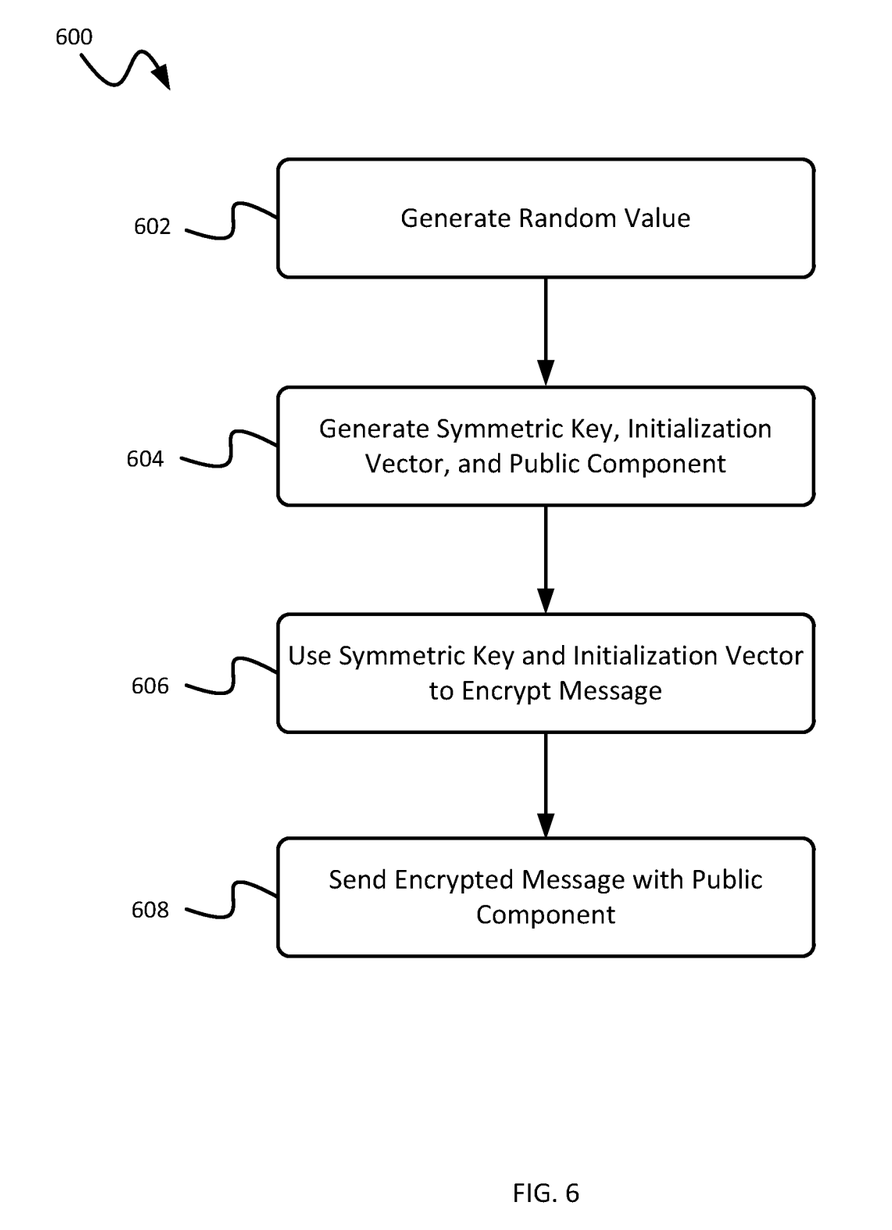
FIG. 6 is a flow chart showing an example hybrid encryption process.

FIG. 6 is a flow chart showing an example process 600 for hybrid encryption. The process 600 can be implemented in any suitable communication system. For example, the process 600 can be implemented in the communication system 100 of FIG. 1 or another type of system. The process 600 can be implemented as a countermeasure against one or more attacks on a cryptography system. For example, the process 600 can incorporate the techniques utilized by the terminal modules 202a, 202b of FIG. 2, the techniques utilized by the terminal modules 302a, 302b of FIG. 3, the techniques utilized by the terminal modules 402a, 402b of FIG. 4, the techniques utilized by the terminal modules 502a, 502b of FIG. 5, or other types of techniques. The process 600 can be implemented using fewer, additional or different operations, and the operations can be performed in the order shown or in a different order.

At 602, a random value is generated. In some implementations, the random value may be the random integer r. The random value may be generated by a pseudorandom generator, such as the pseudorandom generator modules described above, or another type of pseudorandom generator module. The random value generated at 602 can include multiple random values.

At 604, a symmetric key, an initialization vector, and a public component are generated. The symmetric key, the initialization vector, and the public component can each be generated based on the random value generated at 602. The symmetric key can be the private component K generated by one or more of the key derivation and encapsulation modules described above, or another type of symmetric key can be used. The public component can be the public component $c_1$ generated by one or more of the key derivation and encapsulation modules described above, or another type of public component can be used. The initialization vector can be the initialization vector IV generated by one or more of the modules described above, or another type of initialization vector can be used.

In some cases, the public component is computed based on the random value, and the initialization vector is subsequently computed based on the public component. In some cases, the initialization vector and the symmetric key are both computed based on the output of a key derivation function. In some implementations, the symmetric key is based on the random value, and the public component is computed based on both the symmetric key and the public key of a recipient. In some implementations, the symmetric key is computed based on both the random value and the public key of a recipient.

At 606, the symmetric key and the initialization vector are used to encrypt a message. The plaintext message can be encrypted by an encryption module based on the symmetric key K and the initialization vector, for example, using one or more of the techniques described with respect to FIG. 2 or 3, or using another type of technique. At 608, the encrypted message is sent to the recipient. The public component is also sent to the recipient. The encrypted message and the public component may be sent together, or they may be sent separately. A key derivation and encapsulation module (e.g., the key derivation and encapsulation modules described with regard to FIG. 2 or 3) of the recipient can generate the symmetric key based on the recipient's private key and the public component. The recipient can also obtain the initialization vector and decrypt the encrypted message using the symmetric key and the initialization vector, as appropriate.

Subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on non-transitory computer storage medium for execution by, or to control the operation of, data processing apparatus. Alternatively or in addition, the program instructions can be encoded for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple cards, disks, or other storage devices).

Operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing devices or on multiple computers that are located at one site or distributed across multiple sites and interconnected by a communication network.

Processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some aspects, a random value is obtained by a pseudorandom generator. A computing system can generate a symmetric key based on the random value. The computing system can also generate a public component based on the random value. The computing system can additionally generate an initialization vector based on the random value. The public component or the symmetric key is generated based additionally on a public key of an entity. The symmetric key and the initialization vector can be used to generate an encrypted message based on an input message. The encrypted message and the public component can be output for transmission to the entity.

Implementations may include one or more of the following features. Generating the symmetric key based on the random value and the public key of the entity includes computing $K=KDF(rA)$, where KDF represents a key derivation function, K represents the symmetric key, r represents the random value, and A represents the public key of the entity. Generating the public component based on the random value includes computing the public component $C_1=rG$, where G represents a generator of an elliptic curve group, and generating the initialization vector based on the random value includes deriving the initialization vector IV from the public component $C_1$. Deriving the initialization vector IV from the public component $C_1$ includes extracting least significant bits of a binary representation of the public component $C_1$. Deriving the initialization vector IV from the public component $C_1$ includes evaluating a hash function based on the public component $C_1$.

Implementations may include one or more of the following features. Generating the symmetric key based on the random value and the public key of the entity includes computing $X=KDF(rA)$, where KDF represents a key derivation function, X represents an output of the key derivation function, r represents the random value, and A represents the public key of the entity. Generating the symmetric key based on the random value and the public key of the entity includes deriving the symmetric key K from the output of the key derivation function X. Generating the initialization vector based on the random value includes deriving the initialization vector IV from the output of the key derivation function X.

Implementations may include one or more of the following features. The public component is generated based on the random value and the public key of the entity. The random value includes the symmetric key and the initialization vector. Generating the public component based on the random value and the public key of the entity includes generating the public component based on the initialization vector, the symmetric key and the public key of the entity. Generating the public component based on the random value and the public key of the entity includes deriving the public component from a value $K^e$, where (e, N) represents the public key of the entity, and where e and N are integers. Generating the initialization vector based on the random value includes deriving the initialization vector from the value $K^e$.

In some aspects, a public component and an encrypted message can be received. An initialization vector and a symmetric key can be generated based on the public component. The initialization vector or the symmetric key can be generated based additionally on a private key of the entity. The symmetric key and the initialization vector can be used to generate a decrypted message based on the encrypted message.

In some aspects, a hybrid encryption scheme uses a preprocessing function. A random value can be obtained by a pseudorandom generator. A symmetric key and a public component can be generated based on the random value. The public component or the symmetric key can be generated based additionally on a public key of an entity. A preprocessing operation can be applied to an input message. The symmetric key can be used to generate an encrypted message based on the preprocessed input message. The encrypted message and the public component can be output for transmission to the entity.

Implementations of these and other aspects can include one or more of the following features. The preprocessing operation can be a compression function, and the preprocessed input message can be a compressed input message. The preprocessing operation can be an encryption function, and the preprocessed message can be an encrypted message. The preprocessing operation can be an all-or-nothing transform, and the preprocessed message can be an all-or-nothing-transformed message. The preprocessing operation can prepends a random value to the input message, and the preprocessed message can be a padded message. An initialization vector can be used with the symmetric key to generate the encrypted message based on the preprocessed input message.

Thus, implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A hybrid encryption method for outputting an encrypted message and a public component for transmission to an entity comprising:
   obtaining a random value;
   generating, by a computing system, a symmetric key based on the random value and a public key of the entity, wherein generating the symmetric key includes computing K=KDF(rA), where KDF represents a key derivation function, K represents the symmetric key, r represents the random value, and A represents the public key of the entity;
   generating, by the computing system, the public component ($C_1$) based on the random value (r), wherein generating the public component includes computing the public component $C_1$=rG, where G represents a generator of an elliptic curve group;
   generating, by the computing system, an initialization vector (IV) based on the public component;
   using the symmetric key and the initialization vector to generate the encrypted message based on an input message; and
   outputting the encrypted message and the public component for transmission to the entity, wherein the public component enables the entity to decrypt the encrypted message.

2. The method of claim 1, wherein generating the initialization vector IV from the public component $C_1$ includes extracting least significant bits of a binary representation of the public component $C_1$.

3. The method of claim 1, wherein generating the initialization vector IV from the public component $C_1$ includes evaluating a hash function based on the public component $C_1$.

4. A hybrid encryption method for outputting an encrypted message and a public component for transmission to an entity comprising:
   obtaining a random value;
   generating, by a computing system, a symmetric key (K) based on the random value and a public key of the entity, wherein generating the symmetric key includes:
      computing X=KDF(rA), where KDF represents a key derivation function, X represents an output of the key derivation function, r represents the random value, and A represents the public key of the entity; and
      deriving the symmetric key K from the output of the key derivation function X;
   generating, by the computing system, the public component ($C_1$) based on the random value (r), wherein generating the public component includes computing the public component $C_1$=rG, where G represents a generator of an elliptic curve group;
   generating, by the computing system, an initialization vector based on the public component;
   using the symmetric key and the initialization vector to generate the encrypted message based on an input message; and
   outputting the encrypted message and the public component for transmission to the entity, wherein the public component enables the entity to decrypt the encrypted message.

5. A hybrid encryption method for outputting an encrypted message and a public component for transmission to an entity comprising:
   obtaining a random value;
   generating, by a computing system, a symmetric key based on the random value;
   generating, by the computing system, the public component based on the random value and a public key of the entity, wherein generating the public component includes deriving the public component from a value $K^e$, where K represents the symmetric key, (e, N) represents the public key of the entity, and where e and N are integers;
   generating, by the computing system, an initialization vector based on the public component;
   using the symmetric key and the initialization vector to generate the encrypted message based on an input message; and
   outputting the encrypted message and the public component for transmission to the entity, wherein the public component enables the entity to decrypt the encrypted message.

6. A computing device configured to perform operations for hybrid encryption and outputting an encrypted message and a public component for transmission to an entity, the operations comprising:
   obtaining a random value;
   generating, by the computing device, a symmetric key based on the random value and a public key of the entity, wherein generating the symmetric key includes computing K=KDF(rA), where KDF represents a key derivation function, K represents the symmetric key, r represents the random value, and A represents the public key of the entity;
   generating, by the computing device, the public component ($C_1$) based on the random value (r), wherein generating the public component includes computing the public component $C_1$=rG, where G represents a generator of an elliptic curve group;
   generating, by the computing device, an initialization vector based on the public component;
   using the symmetric key and the initialization vector (IV) to generate the encrypted message based on an input message; and
   outputting the encrypted message and the public component for transmission to the entity, wherein the public component enables the entity to decrypt the encrypted message.

7. The computing device of claim 6, wherein generating the initialization vector IV from the public component $C_1$ includes extracting least significant bits of a binary representation of the public component $C_1$.

8. A non-transitory computer-readable medium storing instructions that, when executed, perform operations for hybrid encryption and outputting an encrypted message and a public component for transmission to an entity, the operations comprising:
   obtaining a random value;
   generating, by a computing system, a symmetric key based on the random value and a public key of the entity, wherein generating the symmetric key includes computing K=KDF(rA), where KDF represents a key derivation function, K represents the symmetric key, r represents the random value, and A represents the public key of the entity;
   generating, by the computing system, the public component ($C_1$) based on the random value (r), wherein generating the public component includes computing the public component $C_1$=rG, where G represents a generator of an elliptic curve group;
   generating, by the computing system, an initialization vector based on the public component;

using the symmetric key and the initialization vector (IV) to generate the encrypted message based on an input message; and outputting the encrypted message and the public component for transmission to the entity, wherein the public component enables the entity to decrypt the encrypted message.

9. The computing device of claim 6, wherein generating the initialization vector IV from the public component $C_1$ includes evaluating a hash function based on the public component $C_1$.

10. The computer-readable medium of claim 8, wherein generating the initialization vector IV from the public component $C_1$ includes extracting least significant bits of a binary representation of the public component $C_1$.

11. The computer-readable medium of claim 8, wherein generating the initialization vector IV from the public component $C_1$ includes evaluating a hash function based on the public component $C_1$.

* * * * *